(12) United States Patent
Dean et al.

(10) Patent No.: US 6,651,094 B1
(45) Date of Patent: Nov. 18, 2003

(54) METHOD AND APPARATUS FOR CREATING A PRELOAD IMAGE FOR NETWORK INSTALLATION

(75) Inventors: Jeffrey Randell Dean, Austin, TX (US); Ingrid Milagros Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,207

(22) Filed: Jul. 17, 1998

(51) Int. Cl.[7] ............................................. G06F 15/177
(52) U.S. Cl. ...................... 709/222; 709/220; 709/223
(58) Field of Search ................................. 709/222, 221, 709/220, 225, 223, 229, 226; 713/1, 2, 100, 200, 201

(56) References Cited

U.S. PATENT DOCUMENTS

| | | | | |
|---|---|---|---|---|
| 5,452,454 A | * | 9/1995 | Basu ............................. | 713/2 |
| 5,784,563 A | * | 7/1998 | Marshall et al. ............ | 709/221 |
| 5,842,011 A | * | 11/1998 | Basu ............................. | 713/2 |
| 5,903,650 A | * | 5/1999 | Ross et al. .................... | 380/25 |
| 5,933,631 A | * | 8/1999 | Mealey et al. ................ | 713/2 |
| 6,029,196 A | * | 2/2000 | Lenz ........................... | 709/221 |
| 6,044,465 A | * | 3/2000 | Dutcher et al. ............. | 713/200 |
| 6,052,719 A | * | 4/2000 | Bezanson et al. ........... | 709/220 |
| 6,061,726 A | * | 5/2000 | Cook et al. .................. | 709/226 |
| 6,078,951 A | * | 6/2000 | Pashupathy et al. ........ | 709/217 |
| 6,098,097 A | * | 8/2000 | Dean et al. .................. | 709/220 |
| 6,151,643 A | * | 11/2000 | Cheng et al. ................. | 710/36 |
| 6,167,441 A | * | 12/2000 | Himmel ....................... | 709/217 |
| 6,202,207 B1 | * | 3/2001 | Donohue .................... | 717/173 |
| 6,457,076 B1 | * | 9/2002 | Cheng et al. ................. | 710/36 |

* cited by examiner

Primary Examiner—Saleh Najjar
(74) Attorney, Agent, or Firm—Richard A. Henkler; Leslie A. Van Leewen

(57) ABSTRACT

The present invention is a method and apparatus for generating the second phase (i.e. software for which redistribution rights are limited) of a preload image for networks. The reseller is not required to answer numerous and often repetitive prompts for each application, but merely the location of the desired application.

9 Claims, 5 Drawing Sheets

METHOD AND APPARATUS FOR CREATING A PRELOAD IMAGE FOR NETWORK INSTALLATION

CROSS-REFERENCE TO RELATED APPLICATIONS

The present patent application is related to Ser. No. 09/118,211, filed on Jul. 17, 1998, and issued as U.S. Pat. No. 6,199,108 on Mar. 6, 2001, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK" which is hereby incorporated by reference herein.

In addition, the following applications are also related to the present invention:

The present patent application is related to Ser. No. 09/118,559, filed on Jul. 17, 1998, and issued as U.S. Pat. No. 6,477,436 on Nov. 5, 2002, entitled "SYSTEM AND METHOD FOR CREATION OF A NETWORK COMPUTING ENVIRONMENT".

The present patent application is related to Ser. No. 09/118,208, filed on Jul. 17, 1998, and issued as U.S. Pat. No. 6,243,745 on Jun. 5, 2001, entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS".

The present patent application is related to Ser. No. 09/118,557, filed on Jul. 17, 1998, and issued as U.S. Pat. No. 6,182,131 on Jan. 30, 2001, entitled "DATA PROCESSING SYSTEM, METHOD, AND PROGRAM PRODUCT FOR AUTOMATING ACCOUNT CREATION IN A NETWORK".

The present patent application is related to Ser. No. 09/118,293, filed on Jul. 17, 1998, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY" currently pending.

The present patent application is related to Ser. No. 09/118,210, filed on Jul. 17, 1998, and issued as U.S. Pat. No. 6,209,031 on Mar. 27, 2001, entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS".

The present patent application is related to Ser. No. 09/118,560, filed on Jul. 17, 1998, and issued as U.S. Pat. No. 6,263,346 on Jul. 17, 2001, entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS".

The present patent application is related to Ser. No. 09/118,292, filed on Jul. 17, 1998, and issued as U.S. Pat. No. 6,108,779 on Aug. 22, 2000, entitled "SERVER AND COMPUTER NETWORK THAT PERMIT A CLIENT TO BE EASILY INTRODUCED INTO THE COMPUTER NETWORK".

The present patent application is related to Ser. No. 09/118,209, filed on Jul. 17, 1998, and thereafter abandoned, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES".

The present patent application is related to Ser. No. 09/118.207, filed on Jul. 17, 1998, entitled "METHOD AND APPARATUS FOR CREATING A PRELOAD IMAGE" currently pending.

The present patent application is related to Ser. No. 09/118,558, filed on Jul. 17, 1998, and thereafter abandoned, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES".

The present patent application is related to Ser. No. 09/118,555, filed on Jul. 17, 1998, entitled "AUTOMATIC CLEANUP OF USER DATA IN A NETWORK ENVIRONMENT" currently pending.

The present patent application is related to Ser. No. 09/118,556, filed on Jul. 17, 1998, and issued as U.S. Pat. No. 6,105,100 on Aug. 15, 2000, entitled "METHOD AND APPARATUS FOR DETECTING AND INITIALIZING THE ADDITION OF A NEW CLIENT MACHINE IN A NETWORK".

BACKGROUND

1. Field of the Present Invention

The present invention generally relates to computer systems, and more specifically, to methods and apparatuses that create a preload image for the installation of a network and its associated clients:

2. Background of the Present Invention

Computers and their application programs are used in all aspects of business, industry, and academic endeavors. In recent years, there has been a technological revolution driven by the convergence of the data processing industry with the consumer electronic industry. This advance has been further accelerated by the extensive consumer and business involvement with the Internet in recent years.

As a result of the above noted changes, it seems as if virtually all aspects of human productivity in the industrialized world requires human and computer interaction. The computer industry has been a force for bringing about great increases in business industrial productivity. Almost every week brings computer industry advances which promise even further increases in productivity. These advances offer to drive down business and industry costs and increase efficiency in addition to increasing productivity. In addition, the cost of "computer power" continues to drop as a result of rapid advances in computer related technologies.

As a result of the above noted advances, many different areas of the computer industry are ripe for additional improvements that can increase efficiency and productivity. For instance, in today's current environment, resellers are required to generate a preload image for installation of networks. The term preload image, as referred to hereinafter, comprises all of the desired applications and any other software necessary to operate the network.

Unfortunately, as a result of the various licensing agreements between the parties, the reseller typically only has full and complete redistribution rights to some of the required software. These varying distribution rights cause the reseller to create the preload image in two phases. The first phase of the preload image generation contains the software for which the reseller has full and complete redistribution rights.

The second phase involves the painstaking manual installation of each component (Application) of the remaining software (i.e. that for which the reseller does not have full and complete redistribution rights) by the reseller or someone hired for this dedicated task.

Installation of the remaining software require, a skilled individual in order to execute each installation program of the remaining applications, and tediously provide information for directing the activity of the installation. The above noted process is frustrating, time consuming, and cost prohibitive.

It would, therefore, be a distinct advantage to have a method and apparatus that would improve the second phase of generating the preload image by merely prompting the reseller to specify the location of the remaining software (i.e. CD ROM) without the numerous prompts. The present invention provides such a method and apparatus.

SUMMARY OF THE PRESENT INVENTION

The present invention is a method and apparatus for generating the second phase (i.e. software for which redistribution rights are limited) of a preload image for networks. The reseller is not required to answer numerous and often repetitive prompts for each application, but merely the location of the desired application.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details.

Figure 1:
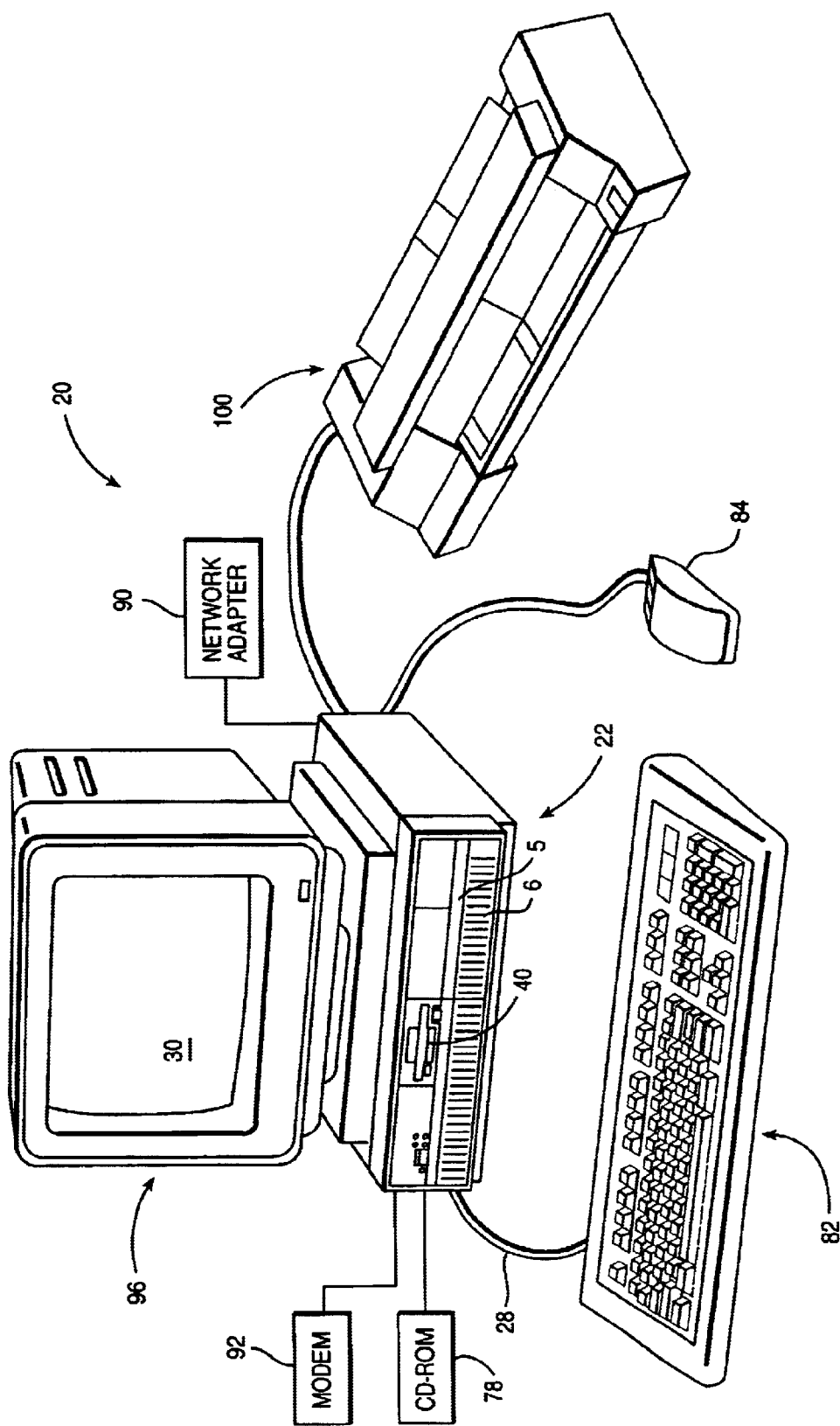
FIG. 1 is a diagram illustrating a data processing system in which a preload image can be created in accordance with the teachings of a preferred embodiment of the present invention.

Reference now being made to FIG. 1, a data processing system 20 is shown in which a preload image can be created in accordance with the teachings of a preferred embodiment of the present invention. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
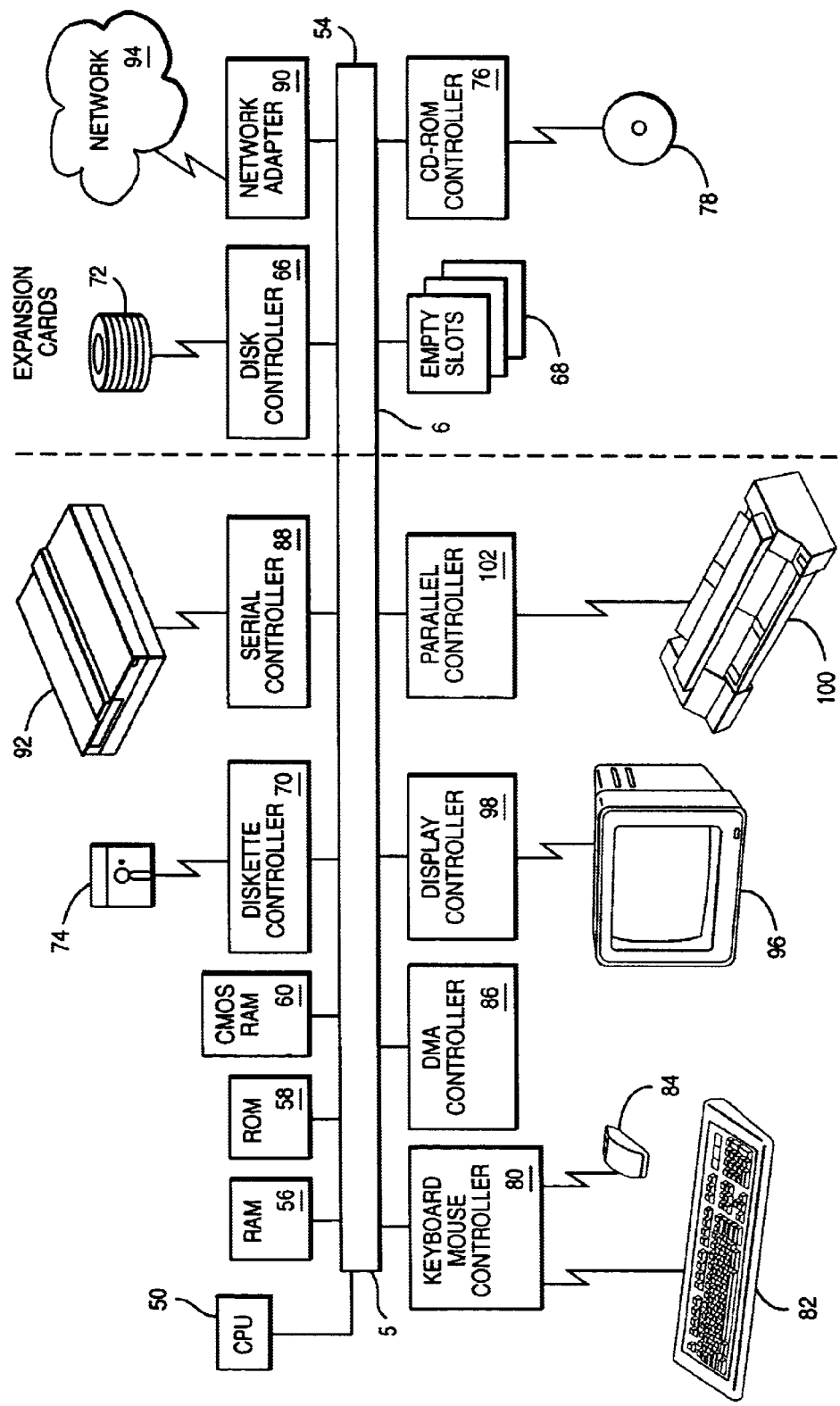
FIG. 2 is a high level block diagram illustrating selected components that can be included in the data processing system of FIG. 1 according to the teachings of the preferred embodiment.

Reference now being made to FIG. 2, a high level block diagram is shown illustrating selected components that can be included in the data processing system 20 of FIG. 1 according to the teachings of the preferred embodiment of the present invention, the data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lop top palm top, and other portable computers, expansion cards usually take the form of PC cards, which are credit card-sized device designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a sepal interface may be used to comnnunicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
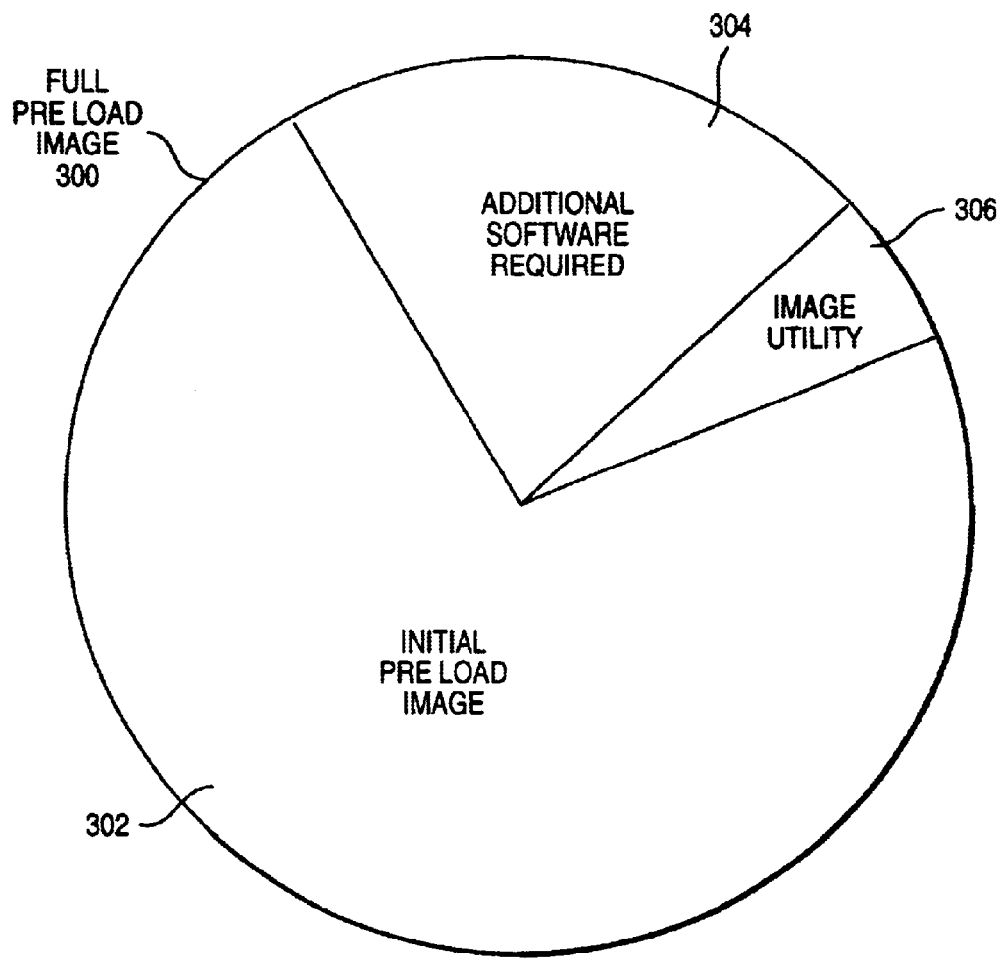
FIG. 3 is a diagram illustrating a complete preload image that was created in accordance with teachings of the preferred embodiment of the present invention.

Reference now being made to FIG. 3, a diagram is shown illustrating a complete preload image 300 that was created according to the teachings of the preferred embodiment of the present invention. As noted in FIG. 3, the complete preload image includes the initial preload image 302 consisting of all the software for which the reseller has fall and complete redistribution rights. The complete preload image 300 also includes the additional software required section 304 for the remaining software that the reseller does not have fill and complete redistribution rights. In addition, the complete preload image 300 includes an image utility 306 for creating the complete preload image 300 without requiring the designated individual to execute each and every installation program for the additionally required software for which the reseller does not have full and complete redistribution rights.

Figure 4:
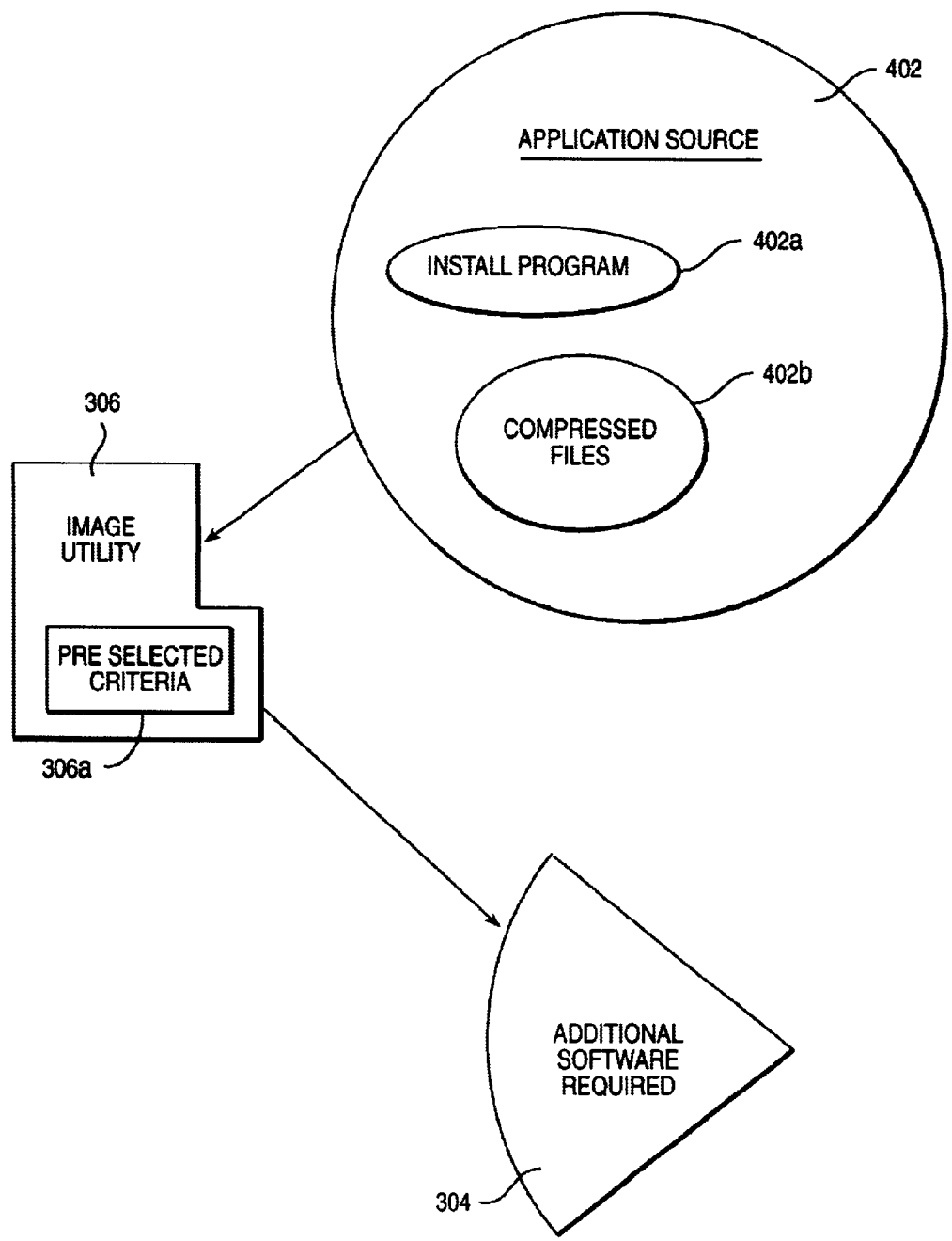
FIG. 4 is a diagram illustrating in greater detail the execution of the image utility of FIG. 3 to create the complete preload image according to the teachings of the present invention.

Reference now being made to FIG. 4, a diagram is shown illustrating in greater detail the execution of the image utility 306 of FIG. 3 to create the complete preload image 300 according to the teachings of the present invention. As shown in FIG. 4, once the image utility 306 is executed, the designated individual is prompted to specify the location (i.e. application source) for any desired software applications for which the reseller does not have full and complete redistribution rights granted.

A typical application source such as application source 402 includes compressed files 402b which are necessary to execute the installed application. In addition, the application source 402 includes an install program 402a (e.g. setup) for ensuring that the end user has the appropriate authorization to install the application program, and for gathering certain preferences and other information prior to installing and decompressing the compressed files 402b.

In the preferred embodiment of the present invention, the complete preload image 300 is created by first executing the image utility 306 upon executing, the image utility 306 prompts the designated individual for the location of each application program (source) desired to complete the additional software required 304 (i.e. software for which the reseller does not have full and complete redistribution rights). Once the designated individual has supplied the location of the application source 402 (e.g. inserting the CD containing the application program) the image 306 determines which application program has been located, and proceeds to ensure that the designated individual has the appropriate access rights (e.g. requiring key access).

Once it has been determined that the designated individual has the appropriate access rights to the application program 402, the image utility reads the compressed files 402b and using the preselected criteria 306a creates the remaining additional software required image 304 for the complete preload image 300.

Figure 5:
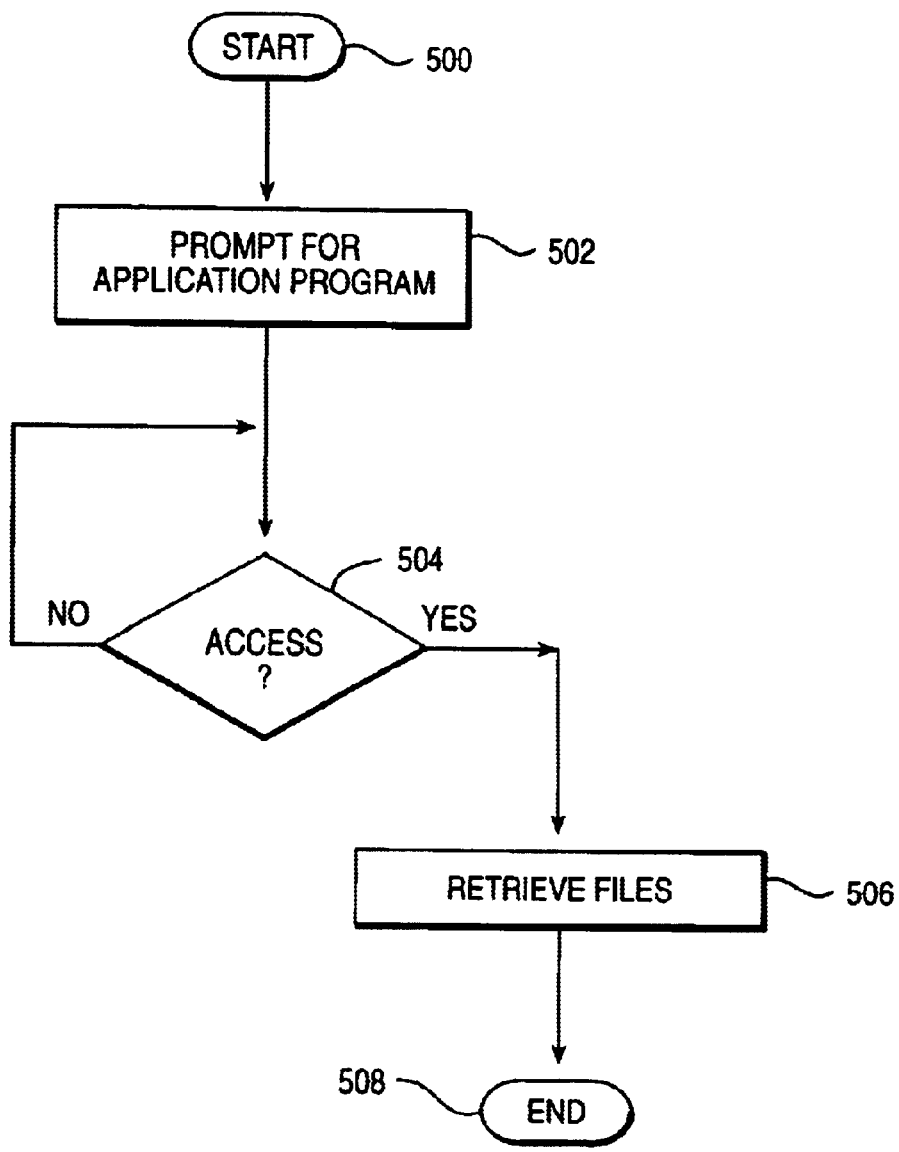
FIG. 5 is a flow chart illustrating the execution of the image utility to create the additional software required portion for the complete preload image of FIG. 3 according to the teachings of the preferred embodiment of the present invention.

Reference now being made to FIG. 5, a flow chart is shown illustrating the execution of the image utility 306 to create the additional software required portion 304 for the complete preload image 300 of FIG. 3 according to the teachings of the present invention. The execution of the image utility 306 begins at step 500, and proceeds to step 502 where the designated individual is prompted for each application program that is desired to create the additional software required portion 304. Upon detecting that the user has specified a source for the application program 402, the image utility 306 determines whether or not the designated individual has the appropriate access rights at step 504.

If, at step 504, it is determined that the designated individual has appropriate access rights (e.g. entered the correct key), then the method proceeds to step 506. If, however, at step 504, it is determined that the designated individual does not have the appropriate access rights, then the method proceeds back to step 504 to prompt the designated individual for the appropriate access rights (e.g. key).

At step 506, the image utility 306 decompresses the compressed files 402b and using the preselected criteria 306a creates the additional software required 304 portion of the complete preload image 300. Thereafter, the method proceeds to end at 508.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A method of creating a preload image for installation of a server network, the method comprising the steps of:

creating a first portion of the preload image containing software for which a seller has redistribution rights;

prompting, using an image utility, a designated individual for a location of additional software for which the seller does not have redistribution rights, and for which the seller desires to become a second portion of the preload image; and creating, using the image utility, a second portion of the preload image, wherein the second portion includes the located additional software.

2. The method of claim 1 wherein the additional software includes compressed files and an installation program, the installation program being used for uncompressing the compressed files, and for requiring a key prior to execution, and the step of creating a second portion of the preload image includes:

requesting, using the image utility, the key from the designated individual;

uncompressing, using the image utility, in response to receiving the key, the compressed files; and installing, using the image utility, the uncompressed files into the second portion of the preload image using default parameters.

3. The method of claim 2 wherein the default parameters include a directory structure for the uncompressed files.

4. An apparatus for creating a preload image for installation of a server network, the apparatus comprising:

means for creating a first portion of the preload image containing software for which a seller has redistribution rights;

means for prompting, using an image utility, a designated individual for a location of additional software for which the seller does not have redistribution rights, and for which the seller desires to become a second portion of the preload image; and means for creating, using the image utility, a second portion of the preload image, wherein the second portion includes the located additional software.

5. The apparatus of claim 4 wherein the additional software includes compressed files and an installation program, the installation program being used for uncompressing the compressed files, and for requiring a key prior to execution, and the means for creating a second portion of the preload image includes:

means for requesting, using the image utility, the key from the designated individual;

means for uncompressing, using the image utility, in response to receiving the key, the compressed files; and means for installing, using the image utility, the uncompressed files into the second portion of the preload image using default parameters.

6. The apparatus of claim 5 wherein the default parameters include a directory structure for the uncompressed files.

7. A computer program product comprising:

a computer usable medium having computer readable program code means embodied in the medium for creating a preload image for installation of a server network, the computer readable program code means including:

means for creating a first portion of the preload image containing software for which a seller has redistribution rights;

means for prompting, using an image utility, a designated individual for a location of additional software for which the seller does not have redistribution rights, and for which the seller desires to become a second portion of the preload image; and means for creating, using the image utility, a second portion of the preload image, wherein the second portion includes the located additional software.

8. The computer program product of claim 7 wherein the additional software includes compressed files and an installation program, the installation program being used for uncompressing the compressed files, and for requiring a key prior to execution, and the means for creating a second portion of the preload image includes:

means for requesting, using the image utility, the key from the designated individual;

means for uncompressing, using the image utility, in response to receiving the key, the compressed files; and means for installing, using the image utility, the uncompressed files into the second portion of the preload image using default parameters.

9. The computer program product of claim 8 wherein the default parameters include a directory structure for the uncompressed files.

* * * * *